United States Patent
Knauf (10) Patent No.: US 7,316,839 B2
(45) Date of Patent: Jan. 8, 2008

(54) REINFORCED PACKAGING WEBS AND METHOD

(75) Inventor: Gary H. Knauf, Bear Creek, WI (US)

(73) Assignee: Thilmany LLC, Kaukauna, WI (US)

( * ) Notice: Subject to any disclaimer, the term of this patent is extended or adjusted under 35 U.S.C. 154(b) by 236 days.

(21) Appl. No.: 10/847,511

(22) Filed: May 17, 2004

(65) Prior Publication Data
US 2004/0213970 A1 Oct. 28, 2004

Related U.S. Application Data

(63) Continuation of application No. 09/978,391, filed on Oct. 16, 2001, now abandoned.

(51) Int. Cl.
*B32B 3/00* (2006.01)
(52) U.S. Cl. .................... 428/292.1; 428/204
(58) Field of Classification Search .............. 428/40, 428/913, 354, 422, 908, 40.7, 507, 292.1, 428/204, 500, 36.3, 34.1, 342
See application file for complete search history.

(56) References Cited

U.S. PATENT DOCUMENTS

| | | |
|---|---|---|
| 2,686,335 A | 8/1954 | Gross |
| 2,690,633 A | 10/1954 | Denton |
| 2,836,851 A | 6/1958 | Holt |
| 3,222,237 A | 12/1965 | McKelvy |
| 3,385,026 A | 5/1968 | Schmermund |
| 3,632,256 A | 1/1972 | Kasting et al. |
| 3,650,880 A | 3/1972 | Tieniber |
| 3,996,728 A | 12/1976 | Gentili |
| 4,233,358 A | 11/1980 | Jones et al. |
| 4,276,334 A * | 6/1981 | Sugihara .................... 428/40.7 |
| 4,362,585 A | 12/1982 | de Antonis |
| 4,554,777 A | 11/1985 | Denk et al. |
| 4,592,938 A | 6/1986 | Benoit |
| 4,675,016 A | 6/1987 | Meuli et al. |
| 4,759,816 A | 7/1988 | Kasper et al. |
| 4,837,088 A | 6/1989 | Freedman |
| 5,005,734 A | 4/1991 | Van Gordon |
| 5,056,294 A | 10/1991 | Focke |
| 5,143,584 A | 9/1992 | Hammer et al. |
| 5,175,978 A | 1/1993 | Knauf |

(Continued)

FOREIGN PATENT DOCUMENTS

JP 09226780 A 9/1997

*Primary Examiner*—Milton I. Cano
*Assistant Examiner*—Camie S. Thompson
(74) *Attorney, Agent, or Firm*—Quarles & Brady LLP (57) ABSTRACT

The specification discloses a method for affixing a strip to an underlying web substrate. According to the method, a substrate web having at least one surface is provided and at least one strip is applied over at least a portion of the substrate surface such that at least a significant portion of an underside surface of the strip disposed adjacent the substrate surface is unbounded to the substrate. A polymer coating is extruded over both the substrate surface and the strip. The strip is thereby affixed to the substrate surface by the coating while the portion of the underside surface of the strip remains substantially unbounded to the substrate surface. At the same time, a substantial portion of an upper surface of the strip adjacent the polymer coating layer is bonded to the coating layer. Also disclosed are packaging materials formed from the reinforced substrate.

36 Claims, 3 Drawing Sheets

U.S. PATENT DOCUMENTS

| | | |
|---|---|---|
| 5,200,268 A | 4/1993 | Hamada |
| 5,250,348 A | 10/1993 | Knauf |
| 5,360,629 A | 11/1994 | Milbourn |
| 5,415,910 A | 5/1995 | Knauf |
| 5,535,573 A | 7/1996 | Focke et al. |
| 5,691,022 A | 11/1997 | Knauf |
| 5,700,586 A * | 12/1997 | Laiho et al. ............... 428/507 |
| 6,080,252 A | 6/2000 | Plourde |
| 6,150,005 A | 11/2000 | Knauf |
| 6,153,306 A | 11/2000 | Selin et al. |
| 6,210,767 B1 | 4/2001 | Knauf |

\* cited by examiner

REINFORCED PACKAGING WEBS AND METHOD

This application is a continuation of application of Ser. No. 09/978,391, filed Oct. 16, 2001, entitled "Reinforced Packaging Webs and Method" now Abandoned.

FIELD OF THE INVENTION

The invention relates to the manufacture of paper webs and, in particular, to the manufacture of reinforced webs for use in packaging applications.

BACKGROUND OF THE INVENTION

Paper and paperboard webs are used in a myriad of applications as packaging materials such as wrappings and boxes. When formed into these packaging materials, it is often desirable to reinforce certain areas of the paper web, particularly critical areas where tears and damage are most likely to occur such as the corners of a box. However, it is normally wasteful to reinforce the entire web including both high and low stress points.

Typically, the solution in the past has been to bond reinforcement strips to the substrate or web in areas which need reinforcement by means of an adhesive or glue placed between the surface of the substrate and the reinforcement strip. The substrate and reinforcement are thus directly bonded to one another.

This solution has disadvantages. In particular, because the substrate and reinforcement are directly bonded to one another, the two have no freedom to move or deform independently of each other. The substrate and reinforcement are in effect combined into a single unit. This in turn leads to a tendency for the substrate and reinforcement to tear and fail together rather than individually and to generally exhibit a lower combined strength than would be expected from the sum of the strengths of the two acting in opposition to a force independently of one another.

Accordingly, it is an object of the invention to provide a method for making a reinforced substrate having improved strength properties.

Another object of the invention is to provide a reinforced substrate wherein the reinforcement is not directly bonded to the substrate.

Still another object of the invention is to provide a reinforced packaging materials have selectively applied reinforcements.

SUMMARY OF THE INVENTION

With regard to the foregoing and other objects and advantages, the present invention provides a method for affixing a strip to an underlying substrate. According to the method, a substrate web is provided having at least one surface. At least one strip is applied over a portion of the substrate web surface such that at least a significant portion of an underside surface of the strip disposed adjacent the substrate surface is substantially unbonded to the substrate web. A polymer coating layer is then extruded over the substrate and the strip such that the strip is affixed to the substrate surface by the coating layer. However, a substantial portion of the underside surface of the strip adjacent the substrate remains substantially unbonded to the substrate surface while a substantial portion of an upper surface of the strip adjacent the polymer coating layer is bonded to the coating layer.

In another aspect, the invention provides a method for making a reinforced packaging material. The method includes the steps of providing an elongate substrate web having at least one surface, providing at least one reinforcement strip adjacent the surface of the substrate web, and extruding a polymer coating over the substrate surface with the reinforcement strip sandwiched there-between in order to cause the strip to be bonded to the coating and to be affixed to the substrate web surface by the coating without any substantial direct bonding between the substrate and an underside surface of the strip adjacent the surface of the substrate web.

Preferably the strip is sandwiched between the coating and the substrate surface by first applying the strip to the substrate surface before the coating is extruded onto the substrate surface.

In yet another aspect, the invention provides a method for affixing a strip to an underlying substrate web which includes, first, proving a substrate web. At least one strip is applied over a portion of the substrate web surface and an underside surface of the strip is temporarily adhered thereto. A polymer coating layer is extruded over the substrate and the strip such that the strip is affixed to the substrate surface by the coating layer and a substantial portion of an upper surface of the strip adjacent the polymer coating layer is bonded to the coating layer. Thereafter, the temporary adhesion between the strip underside and the substrate is removed so that the strip underside is substantially unbonded to the substrate surface.

In still another aspect, the invention relates to a reinforced web product. The product includes a substrate web having at least one surface. At least one strip is disposed adjacent a portion of the substrate web surface such that at least a significant portion of an underside surface of the strip adjacent the substrate surface is substantially unbonded to the substrate. The product also includes a polymer coating layer extruded over the substrate surface and the strip such that the strip is affixed to the substrate surface by the coating layer. The portion of the underside surface of the strip adjacent the substrate web surface is substantially unbonded thereto, while a substantial position of an upper surface of the strip adjacent the polymer coating layer is bonded to the coating layer.

In certain embodiments, it is preferred that a plurality of strips are applied to the substrate surface and affixed thereto by the extruded polymer coating. More preferably, the plurality of strips includes a plurality of elongate strips arranged generally linearly, one after the other, along the length of the substrate in spaced-apart relation. Alternately, a plurality of continuous elongate, relatively narrow strips are arranged in side-by-side spaced-apart relation sandwiched between the substrate and the extruded polymer coating.

It is also preferred that the substrate be a paper web, an oriented polymer film, a metal foil such as an aluminum foil, a non-woven fabric, or a multi-ply web formed by two or more of the foregoing combined. Preferred materials for the strips include a paper web, an oriented polymer film, a metal foil such as an aluminum foil, a non-woven fabric, and a multi-ply web formed by combining two or more of the foregoing.

Preferred polymers for use in the extrusion coating may be selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomers such as SURLYN, ethylene vinyl alcohol (EVOH), polyesters such as polyethylene terephthalate (PET), polyamides such as nylon-6 and nylon-6,6, and mixtures of two or more thereof. The polymer film may also include additives conventional to polymer coatings such as fillers, extenders, and the like.

The coating may be a coextrusion of a plurality of polymers. The coating may also be a single layer or multiple layers.

More preferably the polymer coating is selected from the group consisting of low density polyethylene (LDPE), polyolefin plastomers (POP), polyolefin elastomers (POE), linear low density polyethylene (LLDPE), and high density polyethylene (HDPE).

Preferably, substantially the entire underside surface of the strip is substantially unbonded to the substrate surface in order that the strip is held in place between the coating and the substrate substantially only by the polymer coating extruded over the substrate surface and the strip. It is also preferred that the strip is substantially non-adherent to the substrate web so that the strip is held in place in an enclosed pocket formed by the presence of the strip between the extruded coating and the substrate surface.

In certain embodiments, it is preferred that at least a portion of the underside surface of the strip be temporarily adhered to the surface of the substrate to facilitate retention of the strip on the substrate surface for extrusion of the polymer coating over the strip and substrate surface.

In still another embodiment, it is preferred that the strip be applied over the portion of the substrate surface by at least temporarily adhering the strip to the extruded polymer coating prior to applying the extruded polymer coating onto the substrate.

In other embodiments, the strip is preferably applied as an elongate, substantially continuous web strip having a width substantially less than the width of the substrate web. It is also preferred that the side edges of the extruded coating extend over and beyond side edges of the strip and are adhered to the substrate surface along interfacial areas between surfaces of the substrate and surfaces of the coating.

BRIEF DESCRIPTION OF THE DRAWINGS

The above and other aspects and advantages of the invention will now be further described in conjunction with the accompanying drawings in which.

DETAILED DESCRIPTION OF THE INVENTION

The invention involves a method for affixing a strip such as reinforcement strip to an underlying substrate and to the product so formed. According to the method, a substrate web having at least one surface is provided. At least one strip is sandwiched between the substrate surface and a polymer coating layer extruded over the substrate surface. The strip is thereby affixed to the substrate surface by the overlying layer coating.

As used herein, the term "strip or strips" refers to any material that has a width and/or length dimension somewhat less than that of the substrate and overlying polymer coating so that the strip, when captured, sandwiched, or otherwise held between the coating and the substrate has, along at least one edge, an adjacent area of substantially direct interfacial contact between the extruded coating and the substrate. The strips may therefore be (as described in more detail below) elongate, relatively thin (in width and thickness) webs of material that are substantially continuous in relation to the length dimension of the overall composite product containing the coating, the strip(s), and the substrate. Or, the strips may be individual pieces of spaced-apart material arranged either in a predetermined pattern or randomly (or both) between the coating and the substrate, and they may be of any shape or form appropriate to the end use.

The material for the strips may also vary widely depending on the end use. The strips may therefore be made of paper or paperboard, synthetic polymers including so-called "hard plastics," fibrous synthetic polymer webs, and natural/synthetic fiber blends in the form of woven or non-woven materials. Preferably, the material used for the strips is of such a character (or is treated in such a way) as to be adherent to the over-extruded coating and substantially non-adherent (at least under the use conditions) to the underlying substrate web in the overall composite product.

Figure 1:
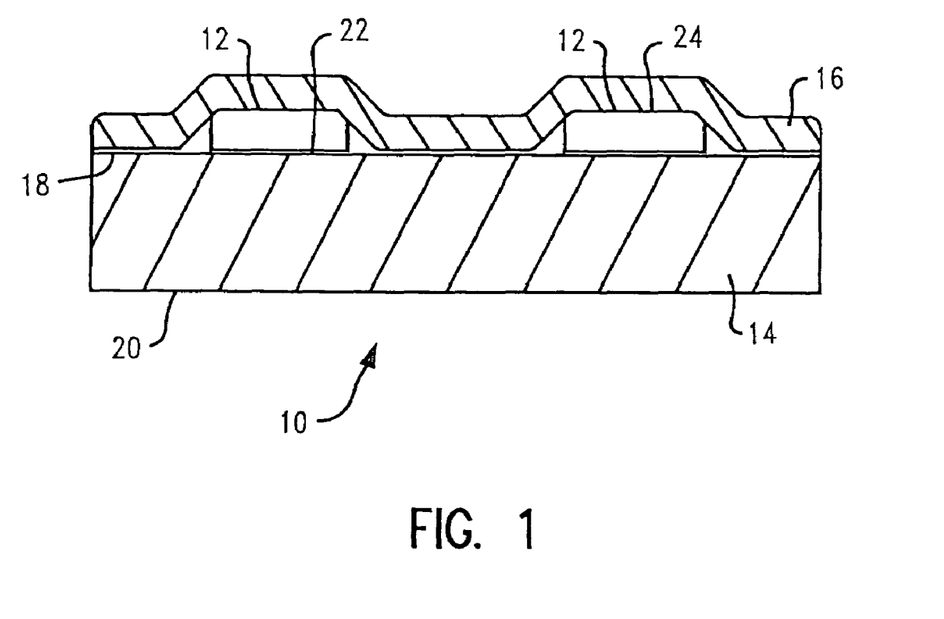
FIG. 1 is a side elevational view of a reinforced substrate formed according to one embodiment of the present invention.

Referring now to the drawings, various aspects of one exemplary embodiment of the invention will now be described with reference to FIG. 1, wherein there is shown a composite web product 10 having one or more strips 12 affixed to a substrate web 14 by an overlying extrusion-coated polymeric layer 16. The composite web 10 is particularly suited for use as a packaging material such as bags and wrappers.

Affixation of strips 12 to the substrate 14 preferably provides a reinforcement function in which the strips 12 act to strengthen or otherwise reinforce portions of the composite web 10, preferably at preselected or strategically placed locations to aid in various functions such as, for example, resistance to an undesirable degree of bending deformation at the locations, additional tear strength (both localized and overall), and the like. It is a feature of the invention that affixation of the strips is accomplished by extrusion coating a polymeric film upon a surface of the substrate in such a manner as to capture or sandwich the strips between the coating and the substrate. By proper consideration of the extruded coating properties and those of the substrate and strips, the latter can be made to be retained in place on the substrate (i.e., "affixed" thereto) by reason of adherence of the coating to the substrate in marginal areas around or adjacent to, but outside of, the areas between the coating and substrate occupied by the strips.

Preferably, the extruded coating is also made to adhere to the adjacent surface of the strips thereby causing the strips to be held by the coating upon the substrate, but to be unbounded to the substrate itself. In this manner, there is no significant interfacial bond between the strip itself and the substrate surface for a significantly improved reinforcement effect.

The underlying substrate 14 is preferably provided as a substantially continuous web having two elongate, substantially parallel surfaces 18, 20 and a thickness there between which is relatively small in comparison to the length and width of the surfaces. Among preferred materials for the substrate web 14 are paper webs, oriented polymer films, aluminum foils and non-woven fabrics.

The basis weight and caliper of the substrate web 14 may vary widely according to the end use and other factors (processibility on an extuder, etc.). Suitable paperwebs may typically have a basis weight of from about 20 lbs/3000 ft$^2$ to about 90 lbs/3000 ft$^2$ for a paper and from about 96 lbs/3000 ft$^2$ to about 240 lbs/3000 ft$^2$ for paperboards. Calipers may range from about 1.7 mils to about 7.5 mils for papers and from about 8 mils to about 20 mils for paperboards. For oriented films, basis weights may typically range from about 8 lbs/3000 ft$^2$ to about 44 lbs/3000 ft$^2$ and calipers may range from about 0.5 mils to about 2 mils. For nonwovens, the basis weight may typically vary from about 10 lbs/3000 ft$^2$ to about 30 lbs/3000 ft$^2$.

The above ranges represent only what is typical and preferred for use in the invention, and are illustrative only. Other weight webs of various types with other thicknesses may also be used in practicing the invention.

Included over at least a portion of the substrate surface 18 are one or more reinforcement strips 12. Preferably a plurality of reinforcement strips 12 are applied over the substrate surface 18 in the form of substantially parallel, elongate, substantially continuous strips. Like the underlying substrate 14, the reinforcement strips 12 are preferably formed from a web material. In the illustrated embodiment, each strip 12 has two elongate, substantially parallel surfaces 22, 24 and a thickness therebetween which is relatively small in comparison to the length and width of the surfaces.

Again, preferred materials for use in forming the strips 12 include paper webs, oriented polymer films, aluminum foils, and non-woven fabrics. Typically, paperwebs used for the strips 12 may have a basis weight of from about 10 lbs/3000 ft$^2$ to about 120 lbs/3000 ft$^2$ and calipers ranging from about 0.8 mils to about 10 mils. For oriented films, basis weights may typically range from about 4 lbs/3000 ft$^2$ to about 44 lbs/3000 ft$^2$ with calipers ranging from about 0.3 mils to about 2 mils. For aluminum foils, typical basis weight may range from about 10 lbs/3000 ft$^2$ to about 22 lbs/3000 ft$^2$ while calipers may vary from about 0.25 mils to about 0.5 mils. For non-wovens, the basis weight may typically vary from about 4 lbs/3000 ft$^2$ to about 30 lbs/3000 ft$^2$. It will be appreciated that these parameters for the strips are given for illustration only to show preferred ranges, characteristics, and the like.

It may thus be seen that the reinforcement strips 12 may be made from many of the same materials as the substrate 14. However, it is also contemplated that the invention may use reinforcement strips that differ in weight and/or composition from the underlying substrate.

A polymer coating 16 is extrusion coated over both the substrate surface 18 and a surface of the strip or strips 12 thereon, the latter of which may be temporarily held in place on the substrate 18 by suitable means. A wide variety of polymeric materials may be used to provide the extruded coating so long as the polymeric material is capable of bonding both to the substrate 18 and to the strips 12 (or be made to bond thereto) when it is extruded over the substrate 14 and reinforcement strips 12 from the melt. Those of ordinary skill in the art will recognize that the particular polymer used to make the coating 16 may also be varied depending on the properties which may be desired in the final product. Preferably, the extruded coating is made from a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers such as SURLYN (a salt of poly (ethylene-methacrylic acid) (available from Dupont), ethylene vinyl alcohol (EVOH), polyesters such as polyethylene terephthalate (PET), and polyamides such as nylon-6 and nylon-6,6. The coating may also be formed as a coextrusion of a plurality of polymers and may be a single layer or multiple layers. The polymer coating may also include conventional additives such as fillers and extenders and the like.

Most preferably, the polymer coating is selected from the group consisting of low density polyethylene (LDPE), polyolefin plastomers (POP), polyolefin elastomers (POE), linear low density polyethylene (LLDPE), and high density polyethylene (HDPE), and is a single layer extrusion.

The thickness and coating weight of the extruded polymer coating 16 may also vary somewhat based on the particular application. Typically, the coating will have a thickness of from about 0.2 mils to about 2.0 mils and a weight of from about 3 lbs/3000 ft$^2$ to about 29 lbs/3000 ft$^2$.

It is to be appreciated that in the final product at least a significant portion of the reinforcement strips 12 are not directly bonded to the substrate surface 18, i.e., there is preferably no significant adhesion between the underside 24 of the strip 12 and the surface of the substrate 14 to directly adhere the two together. The strips 12 are therefore preferably held in place only by the extruded coating 16 which is commonly bonded or adhered to the upper surfaces 18, 22 respectively of the substrate 14 and the strips 12. Thus, the strips are only "indirectly" held in place upon the substrate.

Accordingly, the reinforcement strips 12 may move laterally relative to the underlying substrate 14 to a degree heretofore unachievable with conventional direct bonding of a reinforcement strip to the substrate. This is believed to provide a considerably better reinforcement effect of the embedded strips 12 because their stiffness contribution is less likely to be diminished by interfacial adhesion to the substrate sought to be stiffened, and/or the strips provide an enhanced stiffening effect because of the lack of significant interfacial adhesion.

Figure 2:
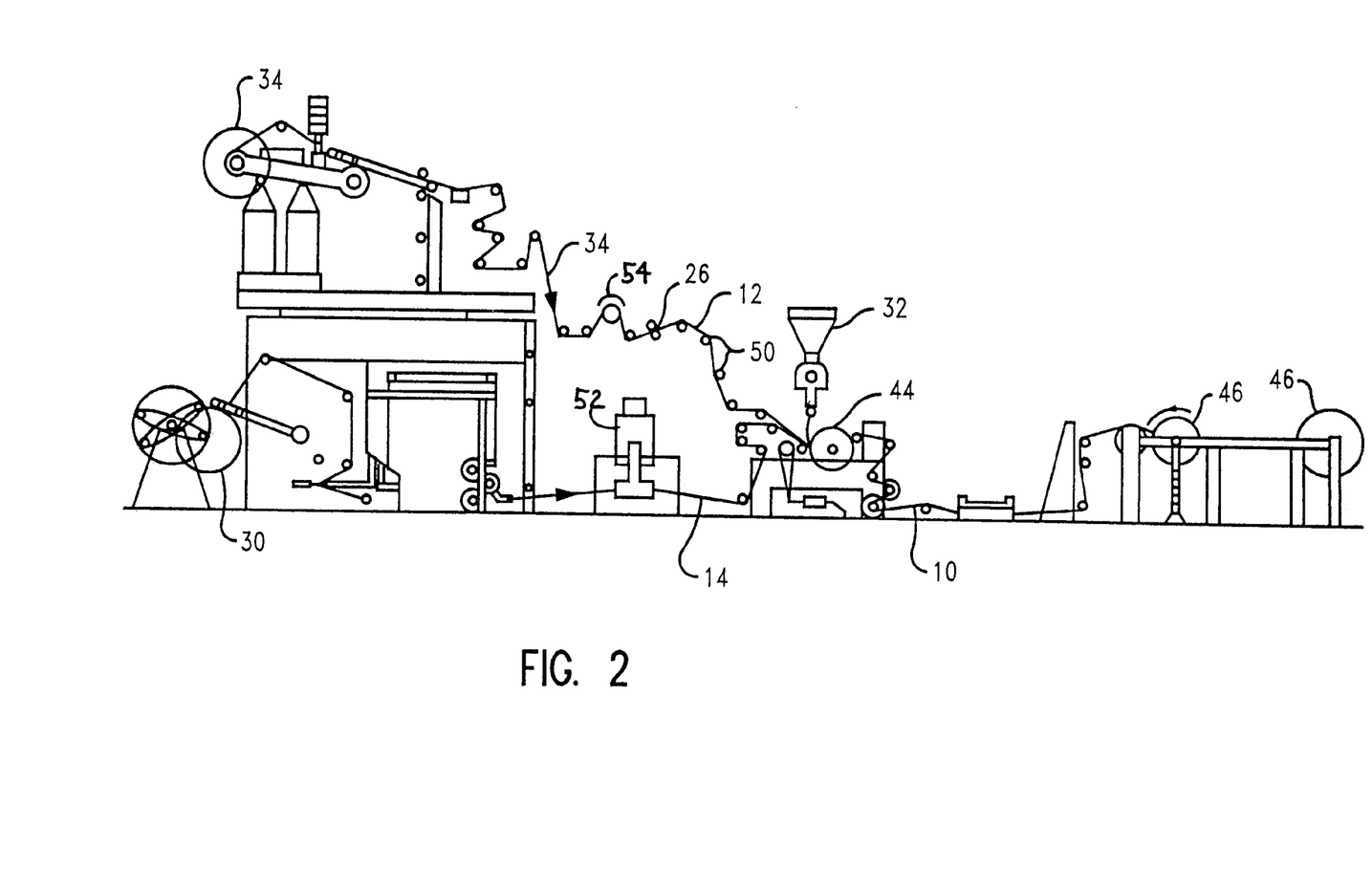
FIG. 2 is a side elevational view of an extrusion line suitable for forming a reinforced substrate according to one embodiment of the present invention.

According to the invention, the preferred method for affixing one or more reinforcement strips 12 to the underlying substrate web 14 involves providing a length of the substrate web, in an uncoated form. Preferably, the substrate is provided as from a wound roll 30, which may be unwound as needed to supply the web to an extruder 32. In commercial applications, the rolls typically will have a width of from about 25 inches to about 130 inches and a total wound up length of about 10,000 ft to about 100,000 ft. Thus, the web 14 may be characterized as continuous (operationally speaking) in its longitudinal or axial dimension.

As noted above, the substrate web 14 may, for example, be a nonwoven fabric, a paper web, an oriented polymer film, or a metal foil such as aluminum foil. Examples of suitable rolls of such materials include SOFTEX nonwovens available from BBA Nonwoven, XKL Kraft paper available from International Paper, LABEL-LYTE polymer films available from Exxon/Mobil, and 8111 metal foil available from Eurofoil.

The reinforcement strips 12 are also preferably provided as a continuous length of material from a second roll of wound web material 34, which is unwound and cut longitudinally, laterally, and/or at any desired angle or shape into appropriately dimensioned strips prior to application to the substrate material. For example, the second web 34 may be slit at intervals across its width (i.e., perpendicular to the web travel direction) into a series of substantially parallel, elongate, substantially continuous reinforcement strips 12 which are spread out for application to the underlying substrate 14 using a spreader device such as a dual roll spreader system. The web of strip material may be suitably cut by processing in a slitter station available from Tidland of Camas, Wash. Preferably, the individual reinforcement strips 12 are cut to a width of from about ½ inch to about 36 inches.

The lengths of reinforcement strips 12 are then aligned with and applied to the substrate 14 in a desired pattern in those portions of the substrate surface in which added strength and reinforcement are desired. It is to be appreciated that when the strips 12 are applied to the substrate 14, they may be merely laid on top of the substrate 14 and are preferably not permanently bonded to the substrate 14. However, given the processing conditions of an extruder including motion of the materials through the air, etc., it may be necessary to either temporarily bond the strips 12 to the substrate 14 and/or use a mechanism such as an overlying press belt, fingers, or the like to hold strips 12 onto the substrate 14 in the desired locations, especially when the strips 12 constitute individual longitudinally space-apart strips that are to become sandwiched between the film 16 and the substrate 14.

For instance, the strips 12 may be temporarily adhered to the substrate 14 by application non-permanent adhesive which initially adheres the strips 12 to the substrate 14. After heating and/or passage of time, the adhesive decomposes and losses its tackiness. Thus, the strips 12 are left substantially unbonded to the substrate 14.

In yet another embodiment, the strips 12 may be temporarily adhered to the substrate 14 by applying an adhesive along a small portion of the strip, such as along an edge of the strip 12. After strip 12 and substrate 14 are extrusion coated, this portion of the strip 12 and substrate 14 may be trimmed away so that the remaining strip portion is substantially unbonded to the substrate 14.

Preferably, either the strips 12, or the substrate 14, or both, are pretreated to improve the adherence of the polymer coating thereto. For instance, the substrate web 14 may be pretreated using a flame treater device 52 and the strips 12 may be pretreated with a electric corona discharge device 54. Such devices are well known to those of skill in the extrusion coatings art.

The substrate 14, with the reinforcement strips 12 applied thereon, is then processed in an extrusion coating station 32 such as a MILLENNIUM extruder available from Egan-Davis Standard of Somerville, N.J. In the extrusion station 32, molten polymer is preferably extruded as a single coating 16 over the substrate 14 after the reinforcement strips 12 have been laid down on the substrate 14 using a slitter 26 and spread out by spreader bars 50.

Figure 3:
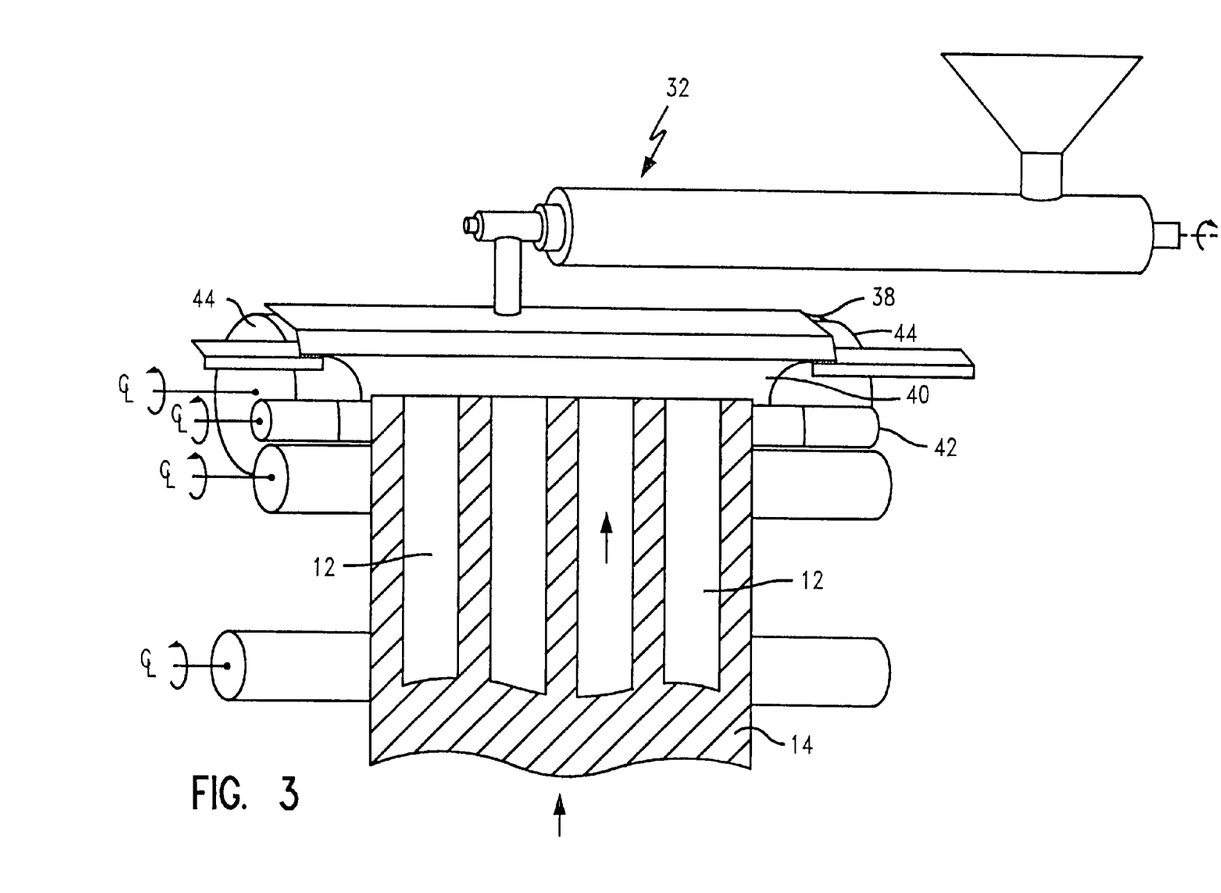
FIG. 3 is an enlarged perspective view of the extruder of FIG. 2.

Preferably polymer is supplied to extruder station 32 in the form of pellets of the polymer which are fed into a hopper and melt-blended in the well-known fashion. The molten polymer is then fed through an extrusion die 38 and a curtain of hot, semi-solid polymer 40 is extruded onto the substrate 14 and strips 12 as they pass through a nip in the extruder 32 formed by a backup roll 42 and chill roll 44. Contacting with the chill roll 44 cools and solidifies the extrudate film to form a three part composite web 10 as seen in FIG. 1.

It will be appreciated, however, that the strips 12 (in their desired shape, etc.) may be cut and placed upon the substrate web or sandwiched between the substrate web and the coating 16 by other mechanisms and/or methods such as, for example, by injecting or otherwise inserting strips into a nip or other point of confluence formed between the extruded film 16 and the substrate web 14 as the coating 16 is being laid down or applied onto the surface of the substrate from the extruder.

Typically the polymer is extruded at a feed rate of about 500 lb/hr to about 1000 lb/hr while the substrate 14 is conveyed at a speed of about 750 ft/minute to about 1500 feet/minute. This results in a polymer coating 16 having a thickness of about 0.5 mil. However, it will appreciated that polymer feed rate and the web travel rate may be varied so as to provide thicker or thinner polymer film coatings.

Again, as the molten extrudate cools it forms a solid film coating 16 which overlays both the substrate 14 and applied reinforcements strips 12. By means of this solid overcoat of polymer, the strips 12 are thereby affixed to the substrate surface 18 without direct bonding between the substrate 14 and the underside 24 of the strips 12.

The reinforced composite web 10 so formed may then be collected and stored on a wind up roll 46 for later use. Preferably, however, composite 10 is further processed to provide packaging material such as a reinforced bag or box or a packaging wrapper using package-making machines and processes well-known to those of ordinary skill. Suitable packaging systems are disclosed in U.S. Pat. Nos. 2,690,633, 4,554,777, 3,996,728, 5,056,294, 3,385,026 and 5,535,573, the disclosures of which are incorporated herein by reference.

In general, reinforced composite 10 is conveyed to a cutting station where it is cut and/or formed into a desired shape to provide a packaging blank. If the strip material has not previously been cut to length, it will be appreciated that it will now be cut to the same length as the packaging blank. Once the ends of reinforcement strips and the substrate are cut to the same length, it will be appreciated that the polymer coating will only hold the strips against the substrate adjacent the sides of the strips, however, the strips cannot be easily dislodged form their positions because they are bonded on their upper surfaces (away from the substrate) to the overlying coating.

The resulting blank may then be folded and sealed, such as with adhesives, as necessary to provide a finished packaging box or bag or wrapper. Such forming operations are well-known to those of ordinary skill in the art.

Advantageously, bags, containers, and other materials made using composites 10 according to the invention exhibit improved strength properties including imposed stiffness and tear strength when stressed as compared to conventional reinforced substrates. Without being bound by theory, it is believed that this improvement may result from the relatively "loose" and indirect bonding between the reinforcement strips and the underlying substrate.

When a reinforcement material and an underlying substrate are continuously bonded to one another along their interfaces such as with an adhesive, the two layers tend to act as a single, unitary piece. Any tearing or breakage of one typically leads to a similar failure in the other. However, in the present invention the substrate and the reinforcement strip or strips are allowed to move and to resist stresses substantially independently of one another by virtue of the relatively loose and indirect bonding of the reinforcement strips to the substrate. As a result, a greater reinforcement effect is achieved than if the reinforcement strips were directly bonded to the underlying substrate.

Reinforced composites produced according to the invention are therefore well-suited to packaging applications wherein it is desired to reinforce and strengthen the corners or other high stress portions of the package while at the same time minimizing excess bag weight. The following application examples describe various composite product embodiment according to the invention.

Coffee Bags

Reinforced bags made in accordance with the invention may be used as packaging for vacuum sealed coffee bags or "bricks". In this application, the invention may be used to provide a package having one or more LLDPE strips reinforcing a substrate which may be made as a laminate of polyethylene terephthalate, LDPE, and a metal foil or a metalized polyolefin film. In this application, the reinforcement strip is typically about 12.5 inches wide and is applied to a substrate which is about 13 inches across. The polymer coating may preferably be a coextrusion of EMAA and LDPE.

Insulated Facing

Another application in which the invention may be used is in providing a reinforced insulation facing. Insulation materials are typically covered with a facing on at least one side. The facing material is chosen to provide stiffness and structure to the insulation material and to provide puncture resistance as the insulation is often handled roughly during installation.

The facing may be provided by a reinforced substrate according to the present invention wherein the underlying substrate is a kraft paper and the reinforcement strips may be another kraft paper or a polymer film such as a polyethylene terephthalate film, a polypropylene film, and/or an HDPE film. A single reinforcement strip about 13 to 14 inches across is applied to a facing substrate that may have an overall width of about 15" inches. A preferred polymer coating in this application is a low density polyethylene (LDPE) extruded over the strip and substrate as described herein.

In this application, the invention also provides an additional insulating effect. It will be appreciated that because the substrate and the reinforcement are not directly bonded together, there exists a pocket space between the two wherein air may be trapped. Because of this air space, facing according to the invention has an insulation effect which may be combined with the insulation effect of the primary insulating material such as fiberglass.

Ream Wrap

Yet another application of the invention is in making reinforced "ream wrap". Papers, such as copier paper and the like are generally sold in bundles of about 500 sheets which are commonly referred to as "reams" of paper. For ease of handling and shipping, these bundles are often packaged in wrappers of heavyweight paper referred as "ream wrap".

Ream wrap may be produced according the invention having reinforcements along the edges and/or corners of the wrapped paper bundle for added strength. The underlying substrate is preferably a kraft paper and the reinforcement strips may be kraft paper as well or a polymer film such as polyethylene terephthalate film, polypropylene film, or nylon film. For the reinforced ream wrap, it is preferred that the substrate have at least two reinforcement strips positioned in the composite so as to reside in the final wrapped ream along the edges and at the corners of the ream. This may suitably be accomplished by providing two reinforcement strips which are approximately 5 inches wide each and located about 5 inches apart on the ream wrap blank that has an overall width of about 22½". The polymer coating extrusion is preferably low density polyethylene (LDPE) or poly propylene (PP).

Frozen Food Packaging

In still another application, the invention may provide a reinforced package for the storage and transportation of frozen foods. In particular, the invention may provide an institutional size package for frozen french fries. Such frozen french fry bags typically have a plurality of thin slits cut into the bag which allow air to escape from the package thereby minimizing the volume of the bag for shipping and storage purposes. Because these slits significantly reduce the strength of the bag, either a heavier bag must often be used or the bag must be reinforced.

The invention provides a reinforced frozen food bag which may be made from a kraft paper substrate and a strip of reinforcement which is preferably another kraft paper or a nonwoven fabric material. For a bag blank which is about 31.5 inches wide, reinforcement strips may be applied as a series of four reinforcement strips which are each about one half inch wide and spaced-apart evenly across the width of the bag blank. Preferably the coating is a coextrusion of SURLYN ionomer and LLDPE.

Sandwich Wrappers

Wrappers for hamburgers and other fast food sandwiches may also be formed from a reinforced substrate according to the invention. In this application, the open pocket of the inventive structure may be advantageously used for insulation purposes as in the aforementioned insulation facing. In this application, the insulating effect will allow the sandwich to remain warm for longer prior to being consumed by the customer.

For the sandwich wrapper, the underlying substrate is preferably a kraft paper and has one reinforcement strip covering most of the width of the paper. For instance, the substrate may have a width of about 9.5 inches and the reinforcement strip may have a width of about 8.25 inches. The reinforcement strip may be provided from a second web of kraft paper for added strength. The coating is preferably low density polyethylene (LDPE).

Wrapper/Napkin Composite

Alternatively, it is envisioned that the reinforcement strip may be a softer paper such as a napkin paper. In this embodiment, the wrapper may be used to provide a napkin for the customer. The napkin paper may be protected by the extrusion coating while the paper is used as a wrapper. Thereafter, the napkin may be separated from the wrapper substrate and the uncoated side thereof may be used to wipe the customer's face and hands clean. The coating may again be LDPE.

Tear-Away Strips

The present invention may also be used to provide tear-away strips which are pre-printed for use as coupons, sweepstakes prizes, game pieces, or which have other special information pre-printed thereon. This information may be preprinted on the uncoated underside of the strip and revealed when the strip is peeled away form the substrate, or alternatively, the information may be pre-printed on top of the strip if the polymer coating is substantially clear. The strips may be printed for use as labels on packaging. For instance, a strip printed with product information may be attached to a package according to the invention and be used in place of a label formed from a pressure sensitive sticker.

The substrate for the strips may suitably be provided in the form of a kraft paper while LDPE is a preferred polymer coating.

Product Package Windows

In still another embodiment, the strips may be formed of a clear and translucent film material and attached to a substrate, such as kraft paper, by an extrusion coating to provide a clear window to see or inspect the product in the package. For instance, a clear window may be made in ream wrap which allows the customer to view the color of the paper in the package. Again, LDPE is a preferred polymer coating material extruded over the strips and substrate.

EXAMPLE

A "ream wrap" package was prepared according to the present invention and its strength was tested in comparison to conventional ream wrap packaging.

For this test, the inventive ream wrap package was prepared using a technique known as "slip sheeting". Slip sheeting is done by cutting a suitable size sheet of substrate web material and placing a strip of double sided sticky tape onto the back side of the substrate sheet. The substrate sheet is then dropped or set into the ingoing side of a nip formed by a moving web and an idler roller on an extrusion coating line. The substrate sheet is instantly bonded to the moving web by the sticky tape and may be further processed along with the moving web such as in an extrusion coating station.

Sheets of substrate material consisting of 50 lb/3000 ft² kraft paper were cut to a size of about 25 inches by 15 inches. A strip material consisting of 0.9 mil, 13 lb/3000 ft² HDPE film available from Mobil was used. The strip material was cut into strips 5 inches wide by 15 inches long. The strips were placed on the substrate sheets so that when wrapped around a ream of 8½ inch by 11 inch copier paper, the strips would protect the long edges and corners of the ream. Small pieces of tape were used to tack the strip materials to the substrate sheet forming a composite consisting of the HDPE film and the ream wrap substrate.

Double side sticky tape was placed on the upper edge of the composite sheet and it was slip sheeted through a commercial extruder and coated with 12 lb/3000 ft² HDPE extrudate at 800 feet/minute. The sheets were located and removed from the finished roll.

The coated slip sheets were then trimmed to about 14.5 inches by 22.5 inches. This trimming removed the sticky tape and the scotch tape holding the strip material to the substrate thereby providing sample packaging blanks reinforced according to the present invention. Reams of 8½ inch by 11 inch Hammermill Tidal DP copier paper were then wrapped by hand in the ream wrap.

The strength of the stip-reinforced ream wrap was tested by allowing the wrapper ream of paper to fall from a height of about 3 feet and land along one of the reinforced 11 inch long edges. For comparison, reams of commercially available paper with a conventional non-reinforced ream wrap were also dropped in the same manner as a test control.

The control reams were found to tear along the bottom edge (i.e., the edge impacting the ground) and thus were considered to have failed the test. Paper reams wrapped with a reinforced paper according to the invention did not tear or burst upon impact. The test was repeated with the same reams a total of three times without failure.

Having now described various aspects of the invention and preferred embodiments thereof, it will be recognized by those of ordinary skill that numerous modifications, variations and substitutions may exist within the spirit and scope of the appended claims.

What is claimed is:

1. A method for affixing a strip to an underlying substrate web, comprising:
   providing a substrate web having at least one surface;
   applying at least one strip over a portion of the substrate web surface such that at least a significant portion of an underside surface of the strip disposed adjacent the substrate surface is substantially unbonded to the substrate web; and
   applying as an extrusion a polymer coating layer over and onto both the substrate and the strip such that the strip is affixed to the substrate surface by the coating layer and said portion of the underside surface of the strip remains substantially unbonded to the substrate surface while a substantial portion of an upper surface of the strip adjacent the polymer coating layer is bonded to the coating layer.

2. The method of claim 1 wherein a plurality of strips are applied to the substrate surface and affixed thereto by the polymer coating layer extruded thereon.

3. The method of claim 1 wherein the substrate web comprises a material selected from the group consisting of at least one of a paper web, an oriented polymer film, a metal foil, and a nonwoven fabric.

4. The method of claim 1 wherein the strip material comprises a material selected from the group consisting of at least one of a paper web, an oriented polymer film, a metal foil, and a nonwoven fabric.

5. The method of claim 1 wherein the extruded polymer coating comprises a polymer selected from the group consisting of at least one of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides (PA).

6. The method of claim 1 wherein the polymer coating comprises a coextrusion of at least two layers of polymer films.

7. The method of claim 1 wherein the extruded polymer coating comprises a polymer selected from the group consisting of at least one of low density polyethylene (LDPE), polyolefin plastomers (POP), polyolefin elastomers (POE), linear low density polyethylene (LLDPE), and high density polyethylene (HDPE).

8. The method of claim 1, wherein the strip is held in place between the coating and the substrate only by the polymer coating extruded by the substrate and the strip.

9. The method of claim 1, wherein the strip is held in place in an enclosed pocket formed by the presence of the strip between the extruded coating and the substrate surface.

10. The method of claim 1, further comprising at least temporarily adhering at least a portion of the underside surface of the strip to the surface of the substrate to facilitate retention of the strip on the substrate surface for extrusion of the polymer coating over the strip and substrate.

11. The method of claim 1, wherein the strip is applied to the substrate surface in advance of extruding the polymer coating layer over the strip and the substrate.

12. The method of claim 1, wherein the strip is applied over the portion of the substrate surface by at least temporarily adhering the strip to the polymer coating prior the extruding coating making contact with the substrate.

13. The method of claim 1, wherein the strip is applied as an elongate web strip having a width substantially less than the width of the substrate web.

14. The method of claim 1, wherein the step of applying the strip comprises applying a plurality of elongate strips in side-by-side, spaced apart relation across at least a portion of the width of the web.

15. A method for making a reinforced packaging material comprising:
providing an elongate substrate web having at least one surface;
providing at least one reinforcement strip adjacent to the surface of the substrate web; and
applying as an extrusion a polymer coating layer over and onto both the substrate surface with the reinforcement strip sandwiched therebetween in order to cause the strip to be bonded to the coating and to be affixed to the substrate web surface by the coating without any substantial direct bonding between the substrate and an underside surface of the strip adjacent to the surface of the substrate web.

16. The method of claim 15 wherein a plurality of strips are provided adjacent the substrate surface and are affixed thereto by the polymer coating.

17. The method of claim 16, wherein the plurality of strips include a plurality of elongate strips arranged generally linearly, one after the other, along the length of the substrate in spaced-apart relation.

18. The method of claim 15, wherein the strip is sandwiched between the coating and the substrate surface by first applying the strip to the substrate surface before the coating is extruded over the substrate surface.

19. The method of claim 15, wherein the strip is an elongate web having a width less than the width of the coating and the substrate so that side edges of the coating extend over and beyond side edges of the strip and are adhered to the substrate surface along interfacial areas between surfaces of the substrate and surfaces of the coating.

20. The method of claim 15 wherein the substrate web comprises a material selected from the group consisting of at least one of a paper web, an oriented polymer film, a metal foil and a nonwoven fabric.

21. The method of claim 15 wherein the strip comprises a material selected from the group consisting of at least one of a paper web, an oriented polymer film, a metal foil and a nonwoven fabric.

22. The method of claim 15 wherein the polymeric coating comprises a polymer selected from the group consisting of at least one of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), and polyesters such as polyethylene terephthalate (PET) and polyamides (PA).

23. The method of claim 15 wherein the polymer coating comprises a polymer selected from the group consisting of at least one of low density polyethylene (LDPE), polyolefin plastomers (POP), polyolefin elastomers (POE), linear low density polyethylene (LLDPE), and high density polyethylene (HDPE).

24. The method of claim 15 wherein the polymer coating comprises a coextrusion of at least two layers of polymer films.

25. The method of claim 15 further comprising forming the packaging material into ream wrap.

26. The method of claim 15 further comprising forming the packaging material into insulation facing.

27. The method of claim 15 further comprising forming the packaging material into a sandwich wrapper.

28. The method of claim 15 further comprising forming the packaging material into a coffee brick wrapper.

29. The method of claim 15, further comprising temporarily adhering at least one reinforcement strip to the substrate web prior to the extrusion coating and removing the temporary adhesion between strip and the substrate after the extrusion coating.

30. A method for affixing a strip to an underlying substrate web comprising:
providing a substrate web;
applying at least one strip over a portion of the substrate web surface and temporarily adhering an underside surface of the strip thereto;
applying as an extrusion a polymer coating layer over and onto both the substrate and the strip such that the strip is affixed to the substrate surface by the coating layer and an upper surface of the strip adjacent the polymer coating layer is bonded to the coating layer; and
removing the temporary adhesion between the strip underside and the substrate so that the strip underside is unbonded to the substrate surface.

31. The method of claim 30 wherein a plurality of strips are applied to the substrate surface and affixed thereto by the polymer coating layer extruded thereon.

32. The method of claim 30 wherein the substrate web selected from the group consisting of at least one of a paper web, a metal foil, an oriented polymer film, and a nonwoven fabric.

33. The method of claim 30 wherein the strip material comprises a material selected from the group consisting of at least one of a paper web, an oriented polymer film, a metal foil, and a nonwoven fabric.

34. The method of claim 30 wherein the extruded polymer coating comprises a polymer selected from the group consisting of at least one of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (BAA), ethylene methyl acrylic acid copolymer (EMAA), ionomoers, ethylene vinyl alcohol (EVOH), and polyesters such as polyethylene terephthalate (PET) and polyamides (PA).

35. The method of claim 30 wherein the extruded polymer coating comprises a polymer selected from the group consisting of at least one of low density polyethylene (LDPE), polyolefin plastomers (POP), polyolefin elastomers (POE), linear low density polyethylene (LLDPE) high density polyethylene (HDPE).

36. The method of claim 30 wherein the polymer coating comprises a coextrusion of at least two layers of polymer films.

* * * * *